United States Patent [19]

Tada et al.

[11] Patent Number: 5,329,812
[45] Date of Patent: Jul. 19, 1994

[54] THERMAL FLOW SENSOR

[75] Inventors: Yasuo Tada; Tomoya Yamakawa, both of Hyogo, Japan

[73] Assignee: Mitsubishi Denki Kabushiki Kaisha, Tokyo, Japan

[21] Appl. No.: 854,082

[22] Filed: Mar. 19, 1992

[30] Foreign Application Priority Data

Mar. 20, 1991 [JP] Japan ................... 3-081440

[51] Int. Cl.⁵ ............................................. G01F 1/68
[52] U.S. Cl. ................... 73/204.21; 73/118.2
[58] Field of Search .......... 73/204.21, 204.25, 204.26, 73/204.27, 204.23, 118.2, 198, 202

[56] References Cited

U.S. PATENT DOCUMENTS

| | | | |
|---|---|---|---|
| 4,210,016 | 7/1980 | Peter et al. | 73/118.2 |
| 4,261,199 | 4/1981 | Sauer | 73/204.21 |
| 4,304,129 | 12/1981 | Kawai et al. | |
| 4,412,449 | 11/1983 | Eiermann et al. | |
| 4,599,895 | 7/1993 | Wiseman | |
| 4,785,662 | 11/1988 | Ohta et al. | 73/204.21 |
| 4,841,781 | 6/1989 | Khaliga | 73/861.22 |
| 4,841,938 | 6/1989 | Weibler et al. | 73/204.21 |

FOREIGN PATENT DOCUMENTS

| | | |
|---|---|---|
| 4209121 | 6/1993 | Fed. Rep. of Germany . |
| 63-144216 | 6/1988 | Japan . |
| 1128125 | 9/1989 | Japan . |

*Primary Examiner*—Herbert Goldstein
*Attorney, Agent, or Firm*—Sughrue, Mion, Zinn, Macpeak & Seas

[57] ABSTRACT

In a thermal flow sensor comprising a cylindrical housing, a straight-pipe-shaped detecting tube, and a heat-sensitive resistor provided in the detecting tube, the housing has a net at its one end opening through which fluid to be measured flows therein, and no net is provided at the other end opening. Instead, an insertion preventing member is provided downstream of the heat-sensitive resistor and inside the detecting tube to prevent the insertion of an unwanted object such as the finger into the detecting tube.

3 Claims, 1 Drawing Sheet

THERMAL FLOW SENSOR

BACKGROUND OF THE INVENTION

This invention relates to a thermal flow sensor for detecting a flow rate with a heat-sensitive resistor.

A type of flow sensor in which flow rate is detected from the thermal balance condition of a bridge including a heat-sensitive resistor, has been disclosed, for instance, by Japanese Patent Application (OPI) No's 144216/1988 and 128125/1989 (the term "OPI" as used herein means an "unexamined published application"). In the flow sensor, in order to provide an excellent response characteristic, the heat-sensitive resistor is made of a metal wire or film which is considerably thin. Hence, it may be broken when a great force is externally applied to it, for instance, with a finger. In order to overcome this difficulty, nets are provided at both upstream and downstream of the flow sensor.

The conventional flow sensor is as shown in FIG. 4. In FIG. 4, reference numeral 1 designates the flow sensor; 2, a cylindrical housing through which fluid flows in the direction of the arrow A; 3 and 4, nets provided at both end openings of the housing 2 (hereinafter referred to as "an upstream end opening 3" and "a downstream end opening 4", respectively, when applicable); 5, a straight-pipe shaped detecting tube provided inside the housing; 6, a temperature sensor arranged inside the detecting tube 5, for detecting the temperature of fluid; 7, a heat-sensitive resistor set in the detecting tube 5 substantially at the middle; and 8, a control section incorporating a control circuit which includes a bridge circuit made up of the temperature sensor 6, the heat-sensitive resistor 7 and two resistors (not shown).

In the flow sensor thus constructed, the nets 3 and 4 are provided upstream and downstream of the heat-sensitive resistor 7 (hereinafter referred to as "an upstream net 3" and "a downstream net 4", respectively, when applicable) as was described above, and therefore, the heat sensitive resistor 7 cannot be touched directly from outside. Hence, this flow sensor is advantageous in that the heat-sensitive resistor 7 is scarcely damaged by external force. However, the flow sensor is disadvantageous in the following manner: Each of the nets 3 and 4 resists the flow of fluid, thus providing a pressure loss. Since the flow sensor has two nets 3 and 4, the loss of pressure is doubled, and therefore, it cannot be disregarded. One of the objects of the upstream net 3 is to regulate the flow of fluid. Therefore, the upstream net 3 may be beneficial although it causes a loss of pressure. On the other hand, the downstream net 4 is not so useful in regulating the flow of fluid, and is not very economical.

SUMMARY OF THE INVENTION

Accordingly, an object of this invention is to eliminate the above-described difficulties accompanying a conventional thermal flow sensor.

More specifically, an object of the invention is to provide a thermal flow sensor which is substantially free a loss of pressure, is economical, and damage to the heat-sensitive resistor is prevented.

The foregoing object and other objects of the invention have been achieved by the provision of a thermal flow sensor comprising: a cylindrical housing through which fluid to be measured flows; a substantially straight-pipe-shaped detecting tube set in the housing; and a heat-sensitive resistor arranged in the detecting tube to detect a flow rate from the amount of heat radiated when the heat-sensitive resistor is heated. A flow regulating means is provided on one end of the housing through which the fluid flows in and also serves a means for preventing the insertion of an unwanted object such as a finger into the housing, and an insertion preventing member is provided downstream of the heat-sensitive resistor and inside the detecting tube so as to prevent the heat-sensitive resistor from being touched by an object such as a finger.

In the thermal flow sensor, the insertion preventing member is provided at the downstream end opening of the detecting tube accommodating the heat-sensitive resistor. Hence, even when the housing is held with the hand, the finger goes into the housing, and a insertion preventing member prevents the heat-sensitive resistor from being damaged by the finger.

The nature, utility and principle of the invention will be more clearly understood from the following detailed description and claims when they are read in conjunction with the accompanying drawings.

BRIEF DESCRIPTION OF THE DRAWINGS

In the accompanying drawings.

DETAILED DESCRIPTION OF THE INVENTION

Preferred embodiments of the invention will be described referring to the accompanying drawings.

Figure 1:
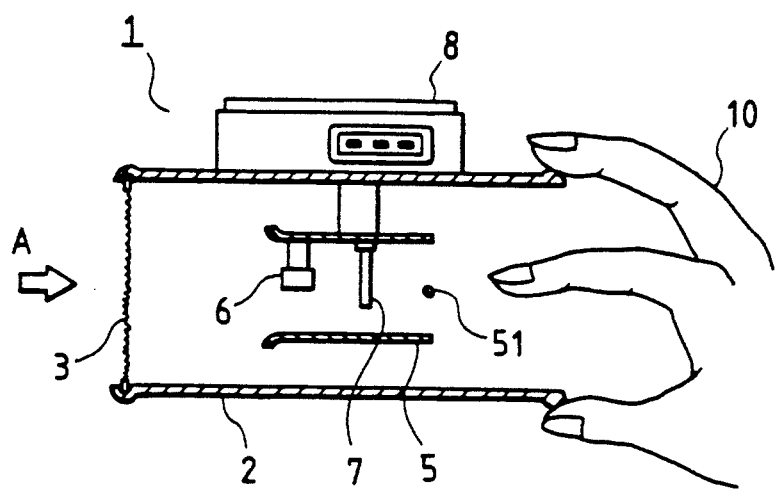
FIG. 1 is a longitudinal sectional view showing one example of a thermal flow sensor according to this invention.
Figure 2:
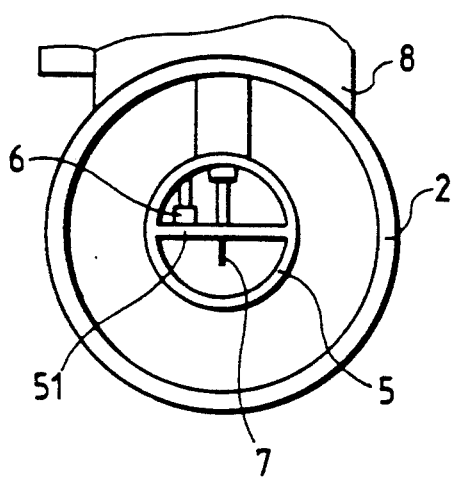
FIG. 2 is a side view of the thermal flow sensor shown in FIG. 1.

The first embodiment of a thermal flow sensor, is shown in FIGS. 1 and 2. The thermal flow sensor is different from the above-described conventional thermal flow sensor in that the downstream net 4 is removed, and instead, an insertion preventing member 51 is provided in the detecting tube 5 at the downstream opening prevents the insertion of the finger or the like.

As shown in FIG. 1, no net is provided at the downstream end opening of the housing 2, and therefore when the housing 1 is held with the hand 10, the finger may go into the housing 2. However, the insertion preventing member 51, provided at the downstream end of the detecting tube 5, prevents the insertion of a finger into the detecting tube 5. As is apparent from FIG. 1 and 2, the insertion preventing member 51 is provided in the fluid passageway in the detecting tube; more specifically, the insertion preventing member covers only a part of the fluid passageway in the housing. Hence, resistance against the flow of fluid in the flow sensor is considerably small.

The insertion preventing member 51 is so arranged that, as shown in FIG. 2, it is laid substantially orthogonal to the heat-sensitive resistor 7 when viewed along the axis of the housing; that is, they are so positioned so that they create a small fluid interference area. Therefore, the adverse effects to the heat-sensitive resistor 7 and to the insertion preventing member 51 due to the fluctuation in configuration thereof, resulting in a stabilation of the flow sensor.

Figure 3:
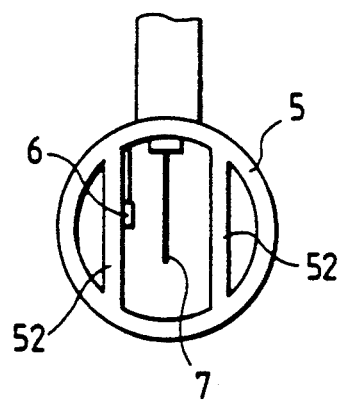
FIG. 3 is a side view showing part of another example of the thermal flow sensor according to the invention.
Figure 4:
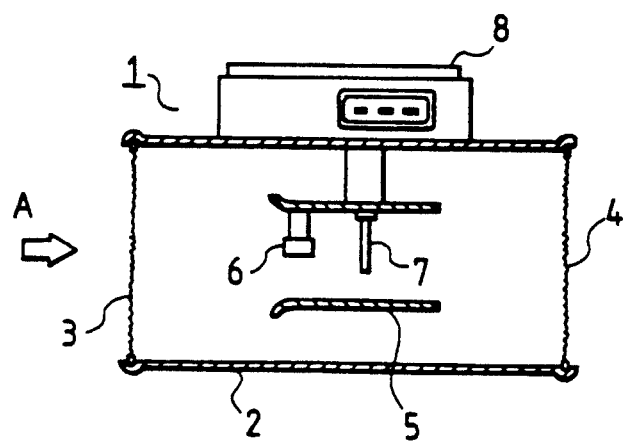
FIG. 4 is a longitudinal sectional view showing a conventional thermal flow sensor.

FIG. 3 shows the second embodiment of the invention. In the thermal flow sensor, the insertion preventing member 52 is not laid orthogonal to the heat-sensitive resistor 7. Hence, the flow sensor is even more stabilized in function than the one shown in FIG. 1.

In each of the above-described first and second embodiments, the insertion preventing member may be formed integral with the detecting tube, or it may be formed as an individual component, which is later connected to the detecting tube 5.

As described above, in the thermal flow sensor of the invention, the insertion preventing member is provided downstream of the detecting tube inside the housing, to prevent the insertion of a finger or the like into the detecting tube. Hence, in the thermal flow sensor, the heat-sensitive resistor is prevented from being damaged although no member such as a net, is provided at the downstream end opening of the housing. In addition, loss of pressure is reduced. Therefore, the thermal flow sensor is economical to use.

While the invention has been described in connection with the preferred embodiments, it will be obvious to those skilled in the art that various changes and modifications may be made therein without departing from the invention, and it is aimed, therefore, to cover in the claims all such changes and modifications which fall within the true spirit and scope of the invention.

What is claimed is:

1. A thermal flow sensor, comprising:
a cylindrical housing through which a fluid to be measured flows;
a substantially straight-pipe-shaped detecting tube set in said housing, said detecting tube defining a fluid passageway;
a heat-sensitive resistor arranged in said detecting tube, a flow rate being detected from an amount of varied heat in said heat-sensitive resistor;
a flow regulating means located at an inlet side of said housing through which said fluid flows into said housing, for preventing the insertion of an unwanted object into said housing; and
an insertion preventing member comprising at least one bar located downstream of said heat-sensitive resistor and covering only a part of the fluid passageway inside said detecting tube, for protecting said heat-sensitive resistor substantially free from a loss of fluid pressure, wherein said at least one bar of said insertion preventing member and said heat-sensitive resistor are laid substantially orthogonal with each other.

2. A thermal flow sensor, comprising:
a cylindrical housing through which a fluid to be measured flows;
a substantially straight-pipe-shaped detecting tube set in said housing;
a heat-sensitive resistor arranged in said detecting tube, a flow rate being detected from an amount of varied heat in said heat-sensitive resistor;
a flow regulating means located at an inlet side of said housing through which said fluid flows into said housing, for preventing the insertion of an unwanted object into said housing; and
an insertion preventing member located downstream of said heat-sensitive resistor and inside said detecting tube, for protecting said heat-sensitive resistor, wherein said insertion preventing member and said heat-sensitive resistor are laid substantially orthogonal with each other.

3. A thermal flow sensor, comprising:
a cylindrical housing through which a fluid to be measured flows;
a substantially straight-pipe-shaped detecting tube set in said housing, said detecting tube defining a fluid passageway;
a heat-sensitive resistor arranged in said detecting tube, a flow rate being detected from an amount of varied heat in said heat-sensitive resistor;
a flow regulating means located at an inlet side of said housing through which said fluid flows into said housing, for preventing the insertion of an unwanted object into said housing; and
at least two insertion preventing members located downstream of said heat-sensitive resistor and being disposed in said detecting tube in parallel with each other and substantially symmetrically with respect to a center line of said detecting tube without intersecting said heat sensitive resistor, so as to cover only a part of the fluid passageway inside said detecting tube, for protecting said heat-sensitive resistor substantially free from a loss of fluid pressure.

* * * * *